(12) United States Patent  
Nagase et al.

(10) Patent No.: US 6,738,107 B2  
(45) Date of Patent: May 18, 2004

(54) LIQUID CRYSTAL DISPLAY DEVICE

(75) Inventors: Yoji Nagase, Kawasaki (JP); Yoshinori Tanaka, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 234 days.

(21) Appl. No.: 09/728,767

(22) Filed: Dec. 1, 2000

(65) Prior Publication Data

US 2001/0002854 A1 Jun. 7, 2001

(30) Foreign Application Priority Data

Dec. 3, 1999 (JP) .......................................... 11-345307

(51) Int. Cl.$^7$ .......................................... G02F 1/1343
(52) U.S. Cl. ........................... 349/39; 349/30; 349/38; 345/92
(58) Field of Search ............................. 345/87, 94, 92, 345/90; 349/33, 42, 172, 38, 30, 39, 86

(56) References Cited

U.S. PATENT DOCUMENTS

| | | | |
|---|---|---|---|
| 4,909,602 A | * 3/1990 | Kaneko et al. | 349/42 |
| 5,640,259 A | * 6/1997 | Sawayama et al. | 349/33 |
| 5,708,454 A | * 1/1998 | Katoh et al. | 345/100 |
| 5,734,454 A | * 3/1998 | Omae et al. | 349/86 |
| 5,835,170 A | * 11/1998 | Fujiwara et al. | 349/38 |
| 6,005,542 A | * 12/1999 | Yoon | 345/92 |
| 6,046,790 A | * 4/2000 | Hara et al. | 349/172 |
| 6,144,353 A | * 11/2000 | McKnight | 345/94 |
| 6,317,113 B1 | * 11/2001 | Wu | 345/92 |
| 6,333,770 B1 | * 12/2001 | Omae et al. | 349/86 |
| 6,462,724 B1 | * 10/2002 | Ozawa et al. | 345/87 |

FOREIGN PATENT DOCUMENTS

| | | |
|---|---|---|
| JP | 06160896 | 6/1994 |
| JP | 07230103 | 8/1995 |
| JP | 09026564 | 1/1997 |
| JP | 11242225 | 9/1999 |
| JP | 2000155317 | 6/2000 |

* cited by examiner

*Primary Examiner*—Steven Saras  
*Assistant Examiner*—Uchendu O. Anyaso  
(74) *Attorney, Agent, or Firm*—Greer, Burns & Crain, Ltd.

(57) ABSTRACT

A storage capacitance Cs0 (=Cs+Csadd) added to a pixel capacitance is set such that a transmittance T1 at a voltage V1 of a pixel electrode becomes substantially equal to a transmittance T2 at a voltage V2 of the pixel electrode when a holding period is terminated. In the case of a normally black type liquid crystal display device, for example, when it is assumed that a white data voltage is VdW, a liquid crystal capacitance in white display is ClcW, and a liquid crystal capacitance in black display is ClcB, a capacitance value of the storage capacitance Cs0 is set such that difference between the transmittance obtained at the pixel voltage, that is changed by an amount of variation $\Delta Vs$ of a pixel voltage expressed by $\Delta Vs = VdW((ClcW - ClcB)/(ClcW + Cs0))$, and the transmittance obtained at the white data voltage VdW can be reduced smaller than 13% of the transmittance obtained at the white data voltage VdW. Accordingly, a predetermined brightness can be obtained by one scanning in response to a display data signal.

5 Claims, 19 Drawing Sheets

Equivalent Circuit of One Pixel

Dependency of Transmittance of a Liquid Crystal on a Voltage

Principle of the Present Invention

Liquid Crystal Display Device

LIQUID CRYSTAL DISPLAY DEVICE

BACKGROUND OF THE INVENTION

1. Field of the Invention

The present invention relates to an active matrix type liquid crystal display device and, more particularly, a liquid crystal display device suitable for the display of the moving picture.

2. Description of the Prior Art

An active matrix type liquid crystal display device can prevent cross talk by providing switching elements, which are turned OFF to cut off the signal when they are not selected, to respective pixels and also can exhibit excellent display characteristics better than a simple matrix type liquid crystal display device. In particular, since a liquid crystal display device employing TFTs (Thin Film Transistors) as the switching elements has a high TFT driving capability, it can exhibit excellent display characteristics that are equivalent to the CRT (Cathode Ray Tube). Therefore, in recent years, the active matrix type liquid crystal display device is widely used in the personal computer and other OA (Office Automation) equipment.

Moving pictures are often displayed on a personal computer because of the spread of multimedia. Also, when a liquid crystal display device is employed in a TV receiver set, a high quality moving picture display performance is desired. Therefore, the liquid crystal display device needs to increase a response speed.

In general, the liquid crystal display device has a structure in which the liquid crystal is sealed between two sheets of transparent substrates. Opposing electrodes, color filters, an alignment film, etc. are formed on one surface side of two surfaces (opposing surfaces) of these transparent substrates opposing to each other, while TFTs, pixel electrodes, the alignment film, etc. are formed on the other surface side. In addition, polarizing plates are stuck onto the opposing surface of the transparent substrate and the surface on the opposite side respectively. These two sheets of polarizing plates are arranged such that polarization axes of the polarizing plates can intersect orthogonally with each other, for example. According to this, the liquid crystal display device is set to the mode in which the light is transmitted when no electric field is applied and the light is cut off when the electric field is applied, i.e., the normally white mode. Also, if the polarization axes of two sheets of polarizing plates are positioned in parallel, the liquid crystal display device is set to the normally black mode. In the following explanation, the substrate on which the TFTs, the pixel electrodes, etc. are formed is referred to as a TFT substrate, and the substrate on which the opposing electrodes, the color filters, etc. is referred to as an opposing substrate.

FIG. 1 is a plan view of the TFT substrate showing one pixel of the MVA (Multi-domain Vertical Alignment) system liquid crystal display device in the prior art. This MVA system liquid crystal display device is set forth in detail in Japanese Patent 2947350 Gazette issued to the applicant of this application, for example.

A plurality of gate bus lines 611 are formed in parallel with each other on a display portion of the liquid crystal display device. Also, a plurality of data bus lines 661 are formed on the display portion of the liquid crystal display device to intersect orthogonally with the gate bus lines 611. Rectangular regions that are partitioned with the gate bus lines 611 and the data bus lines 661 are pixel regions respectively. In addition, storage capacitance bus lines 612 are formed between the gate bus lines 611 in parallel with the gate bus lines 611.

A pixel electrode 68 and a TFT 69 are formed in the pixel region respectively. The pixel electrode 68 is formed of transparent conductive material such as ITO (Indium-Tin Oxide), or the like. In this example, a plurality of slits 68a that are arranged in the oblique direction are provided in the pixel electrode 68. The so-called alignment division (multi-domain) can be achieved by the slits 68a and projections provided on the opposing substrate side.

A silicon film (not shown) acting as an active layer of the TFT 69 is selectively formed over the gate bus lines 611. A part of the gate bus line 611 acts as a gate electrode of the TFT 69. Also, a source electrode 663 and a drain electrode 662 are formed on both sides of the silicon film respectively. The source electrode 663 is electrically connected to the pixel electrode 68, and the drain electrode 662 is electrically connected to the data bus line 661.

In the liquid crystal display device constructed in this manner, when a scanning pulse is supplied to the gate bus line 611, the TFT 69 is turned ON and then a display data signal that has been supplied to the gate bus line 611 is loaded onto the pixel electrode 68. Thus, the direction of liquid crystal molecules contained between the pixel electrode 68 and the opposing electrode is changed in the direction to correspond to the direction of the electric field, and thus the light transmittance is changed. A desired image can be displayed on the liquid crystal display device by controlling the light transmittance of all pixels of the display screen.

In the meanwhile, storage capacitances are formed in parallel with the liquid crystal capacitances in the prior art. In general, the storage capacitance is formed by the storage capacitance bus line 612, the pixel electrode 68, and an insulating film formed between them. For the purpose of relaxing the residual phenomenon of the image (so-called sticking), this storage capacitance is set to reduce the DC voltage applied to the liquid crystal smaller than a constant level. More particularly, a magnitude of the feed-through voltage is calculated based on the parasitic capacitance between the gate electrode of the TFT 69 and the pixel electrode 68, the dielectric constant of the liquid crystal, etc., and then a magnitude of the storage capacitance is set based on this value of the feed-through voltage not to generate defects such as the sticking, etc.

A way of setting the capacitance values used as the design standard of the storage capacitance in the prior art will be explained hereunder.

In the prior art, the capacitance value of the storage capacitance is set such that a value of $\Delta Vc$ given in following Eq. (1) becomes less than 0.5 V.

$$\Delta Vc = |VsB - \Delta VsW| \tag{1}$$

In this case, $\Delta VsB$ and $\Delta VsW$ are given by following Eqs. (2), (3) respectively.

$$\Delta VsB = \Delta Vg \ Cgs/(Cgs + Cs + ClcB) \tag{2}$$

$$\Delta VsW = \Delta Vg \ Cgs/(Cgs + Cs + ClcW) \tag{3}$$

Where $\Delta VsB$ and $\Delta VsW$ are variation in the pixel voltage respectively when the gate waveform is risen up in the white display and the black display, and are called the feed-through voltage. Also, $\Delta Vg$ is an amplitude of the gate signal, Cgs is a capacitance between the gate bus line and the pixel electrode when the TFT is in its conductive state, Cs is the storage capacitance, ClcB is the liquid crystal capacitance in the black display, and ClcW is the liquid crystal capacitance in the white display.

As an example, in the case of the 15-inch liquid crystal display device (XGA: 1024×768 pixels), the capacitance value of the storage capacitance Cs is decided as about 150 fF if ΔVc is 0.48 V, ΔVg is 26.5 V, Cgs is 33 fF, ClcB is 180 fF, and ClcW is 270 fF.

Since the value of Cgs has the voltage dependency, it is hard to calculate precisely the feed-through voltage, but such value of Cgs is approximated by the value obtained when the TFT is in its conductive state. Accordingly, when the feed-through voltage is measured actually, there is the possibility that the measured value is different from the calculated value. However, when the value of the storage capacitance Cs is decided experimentally to satisfy the above Eqs., the defects such as the sticking, etc. can be prevented.

In addition, the case where the storage capacitance is formed by the storage capacitance bus line 612, the pixel electrode 68, and an insulating film formed between them is explained in the above example. Various configurations of the storage capacitance except this case have been proposed in the prior art. For example, the configuration in which the electrode is formed over the storage capacitance bus line is proposed in Patent Application Publication (KOKAI) Hei 6-160896, the configuration in which the storage capacitance electrode is formed perpendicularly to the substrate is proposed in Patent Application Publication (KOKAI) Hei 7-230103, and the configuration in which different values of the storage capacitance are set according to colors of the color filters is proposed in Patent Application Publication (KOKAI) Hei 9-26564.

However, the moving picture displaying performance is not sufficient in the liquid crystal display device in the prior art. The reason for this will be given in the following.

Generally, since a voltage response time of the dielectric constant of the liquid crystal is set longer than a scanning period of the pixel in the display device utilizing the liquid crystal, the capacitance of the liquid crystal is varied after charging or discharging of the pixel is completed. As a result, the voltage of the pixel electrode is also varied and thus the desired brightness cannot be obtained only by one scanning in response to the display data signal.

SUMMARY OF THE INVENTION

It is an object of the present invention to provide a liquid crystal display device that can get a predetermined brightness in response to a display data signal by one scanning and have the excellent displaying performance of the moving picture.

According to the present invention, in the liquid crystal display device having the pixel capacitance formed by the pixel electrode and the storage capacitance added to the pixel capacitance, the capacitance value of the storage capacitance is set such that the transmittance T1 obtained at the voltage V1 of the pixel electrode when the scanning period is terminated is substantially equal to the transmittance T2 obtained at the voltage V2 of the pixel electrode when the holding period is terminated.

As described above, according to the present invention, since the capacitance value of the storage capacitance is set according to an amount of variation of the pixel voltage or an amount of the transmittance, a predetermined brightness can be obtained within one data loading period in response to the display data signal. Accordingly, such an advantage can be achieved that the moving picture display performance of the liquid crystal display device can be improved.

DESCRIPTION OF THE PREFERRED EMBODIMENTS

The present invention will be explained in detail hereinafter.

Figure 2:
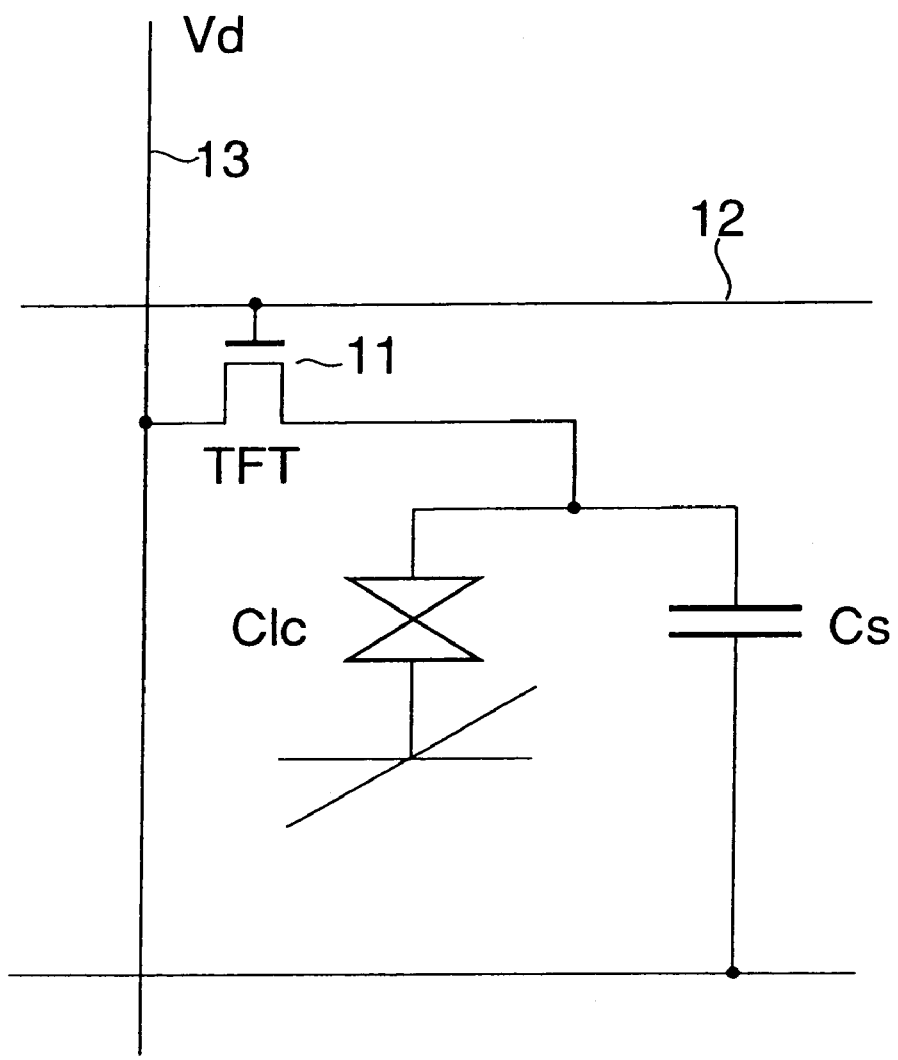
FIG. 2 is a circuit diagram showing an equivalent circuit of the pixel of the liquid crystal display device.

FIG. 2 is a circuit diagram showing an equivalent circuit of one pixel of the liquid crystal display device. The pixel of the liquid crystal display device is represented by a pixel capacitance Clc, a TFT 11, and a storage capacitance Cs. The pixel capacitance Clc is formed of a pixel electrode, an opposing electrode, and a liquid crystal existing between them. A gate of the TFT 11 is connected to a gate bus line 12, a drain is connected to a data bus line 13, and a source is connected to the pixel capacitance Clc and the storage capacitance Cs. A scanning pulse is supplied to the gate bus line 12 at a predetermined timing. The TFT 11 is turned ON by the scanning pulse. Then, a display data voltage Vd is applied from the data bus line 13 to the pixel capacitance Clc and the storage capacitance Cs.

A pulse width (also referred to as "scanning period" hereinafter) of the scanning pulse is decided by the resolution of a display screen and a screen rewriting frequency. For example, when the screen rewriting frequency is set to 60 Hz in the XGA (1024×768 pixels) liquid crystal display device, the scanning period is about 20 $\mu$sec. Since a size of the TFT 11 is set sufficiently large by taking account of the pixel capacitance Clc and the storage capacitance Cs, the pixel voltage becomes equal to the display data voltage Vd when the scanning period is terminated.

In contrast, since a voltage response speed of the dielectric constant of the liquid crystal is of the order of several tens msec and is sufficiently longer than the scanning period, the dielectric constant during the scanning period has a constant value, i.e., a value corresponding to the pixel voltage obtained by loading the display data at preceding time. Then, after the loading of the display data at this time is completed, the dielectric constant of the liquid crystal is varied in a holding period (OFF period of the TFT 11) toward the value corresponding to the rewritten pixel voltage. This variation in the dielectric constant of the liquid crystal causes the variation in the pixel voltage.

Figure 3:
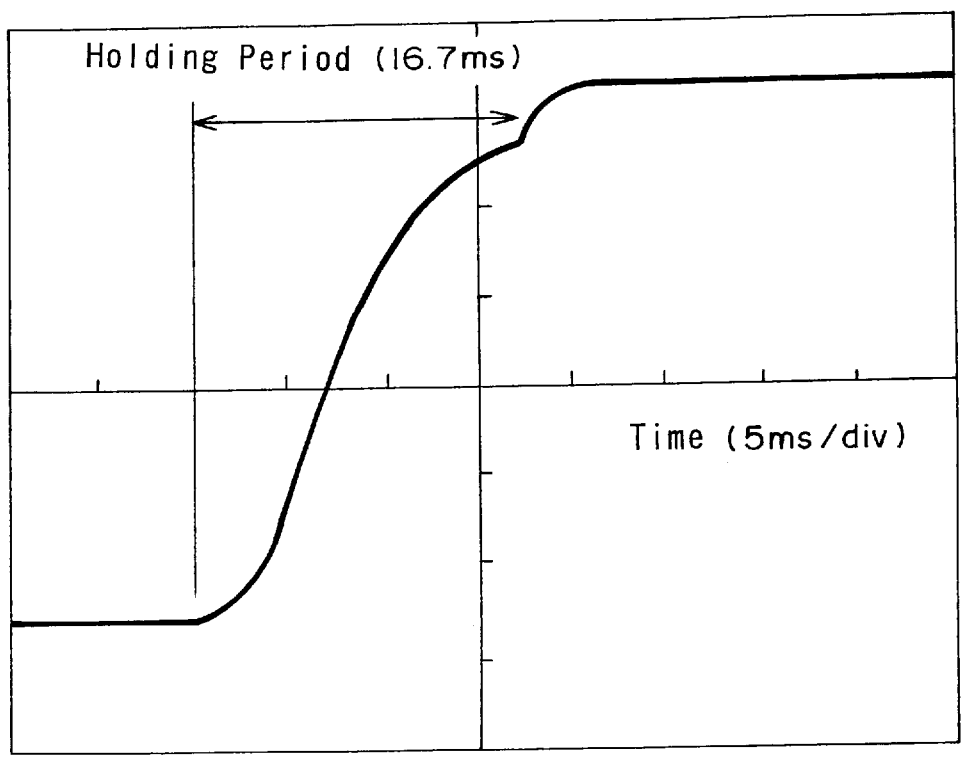
FIG. 3 is a graph showing the measured result of change in the brightness of the 15-inch MVA system liquid crystal display device (XGA)

FIG. 3 is a graph showing the measured result of change in the brightness of the 15-inch MVA system liquid crystal display device (XGA), wherein an abscissa denotes a time and an ordinate denotes brightness (output of a brightness measuring apparatus). As shown in FIG. 3, it can be seen that, in the liquid crystal display device in the prior art, change in the brightness from starting the loading is slow and thus the brightness does not reach the predetermined brightness in the holding time (16.7 msec) only by one data loading. In other words, an apparent response speed of the liquid crystal display device is longer than the screen rewriting time, i.e., is about 20 msec if the screen rewriting frequency is 60 Hz. The optical response speed of the actual liquid crystal is almost equivalent to the response speed of the dielectric constant of the liquid crystal, but the apparent response speed becomes longer than the brightness response speed of the actual liquid crystal.

The above phenomenon is explained particularly hereunder.

Figure 4:
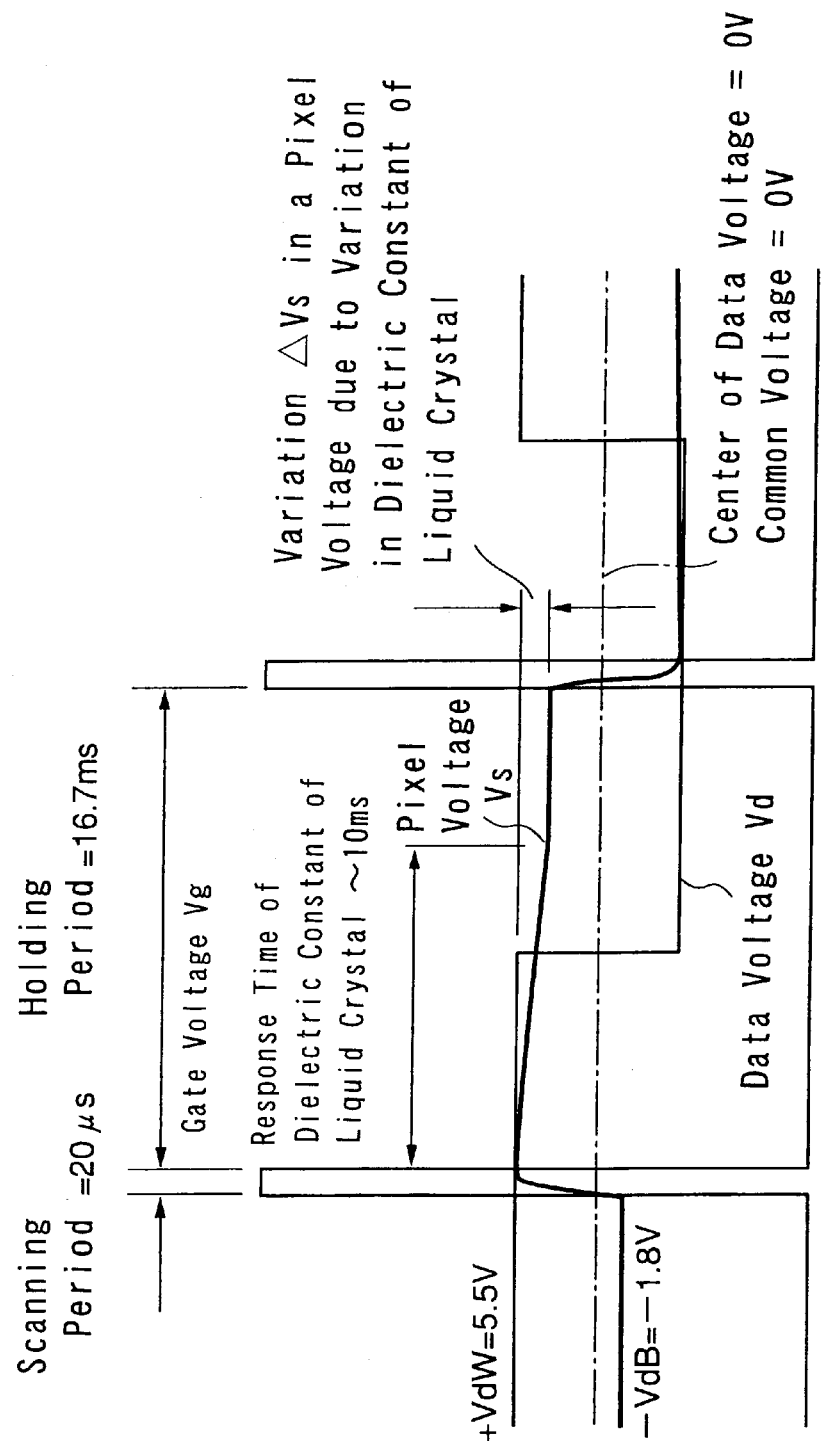
FIG. 4 is a view showing an electrode voltage waveform in positive polarity scanning in the pixel represented by the equivalent circuit shown in FIG. 2 when the display is switched from the black display to the white display.

FIG. 4 is a view showing an electrode voltage waveform in positive polarity scanning in the pixel represented by the equivalent circuit shown in FIG. 2 when the display is switched from the black display to the white display. Here, in order to facilitate the explanation, a center voltage of the display data signal is set to 0 V, and voltage variation caused by the parasitic capacitance between the gate electrode of the TFT 11 and the pixel electrode, i.e., the so-called feed-through voltage, pixel voltage variation caused by a leakage current in the holding period, etc. are neglected. Also, a one-side amplitude VdW of a white display data signal is set to 5.5 V (an amplitude of the data voltage is 11.0 V), a one-side amplitude VdB of a black display data signal is set to 1.8 V (an amplitude of the data voltage is 3.6 V), and a common voltage is set to 0 V.

When the gate voltage Vg becomes a "H" level after the scanning is started, the TFT 11 comes into its conductive state. Then, the display data signal being supplied to the data bus line 13 is supplied to the pixel capacitance Clc and the storage capacitance Cs and then the pixel capacitance Clc and the storage capacitance Cs are charged. Accordingly, the voltage Vs of the pixel electrode is risen up from a black display pixel voltage −VdB of negative polarity and then reaches a white display data voltage +VdW.

Since the voltage response speed of the dielectric constant of the liquid crystal is about 10 msec (when the voltage is changed from 2 V to 5 V), it is sufficiently longer than the scanning period of 20 $\mu$sec. Thus, the dielectric constant of the liquid crystal during the scanning period is constant and thus it may be considered as the dielectric constant corresponding to the applied voltage VdB. For example, when the applied voltage is 1.8 V, a relative dielectric constant $\epsilon$B is 4.0. The voltage VdW is applied to the liquid crystal in the scanning period, nevertheless the dielectric constant of the liquid crystal becomes the value $\epsilon$W decided by the voltage VdW at the end of the holding period since the holding period is longer than the response time of the dielectric constant of the liquid crystal.

Figure 5:
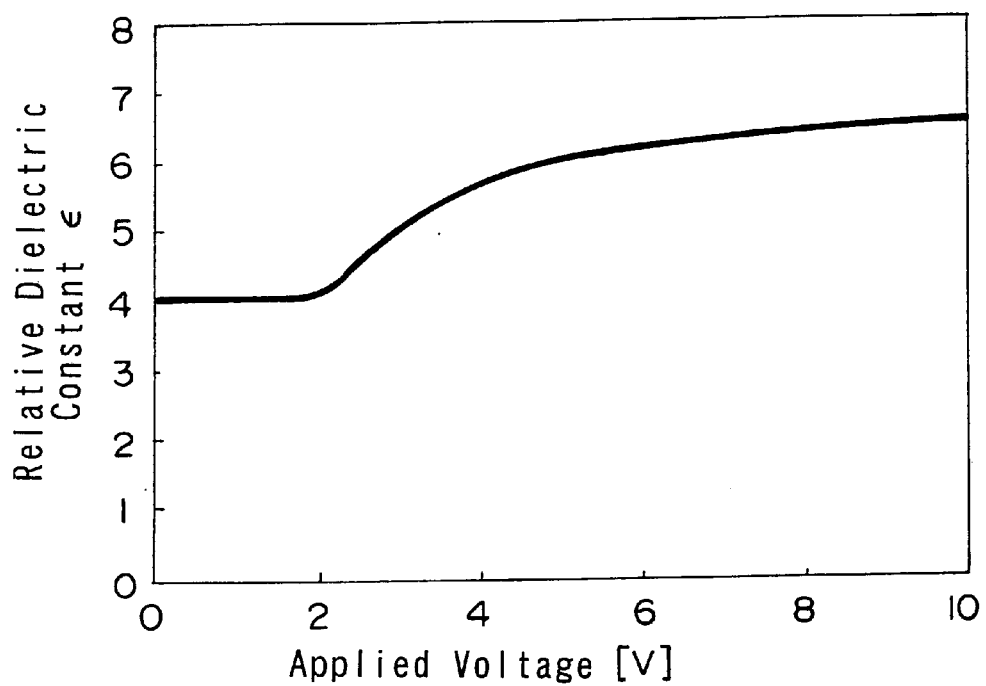
FIG. 5 is a graph showing a dependency of a relative dielectric constant of the liquid crystal on a voltage.

FIG. 5 is a graph showing a dependency of the relative dielectric constant of the liquid crystal on the voltage, wherein an abscissa denotes the applied voltage and an ordinate denotes the relative dielectric constant $\epsilon$W. From FIG. 5, the dielectric constant $\epsilon$W is 6.1 when the applied voltage is 5.5 V. An amount of variation $\Delta$Vs in the pixel voltage Vs due to variation in the dielectric constant can be given by following Eq. (4).

$$\Delta Vs = VdW((ClcW - ClcB)/(ClcW + Cs)) \quad (4)$$

Where ClcW is the liquid crystal capacitance when the white display voltage is applied, and ClcB is the liquid crystal capacitance when the black display voltage is applied. Also, Cs is the storage capacitance.

For instance, in the case of the 15-inch MVA system liquid crystal display device (XGA) in the prior art, $\epsilon$W=6.1, $\epsilon$B=4.0, and when a cell thickness is 4 $\mu$m, ClcW=270 fF, ClcB=180 fF, and Cs=150 fF.

In general, for the purpose of relaxing the residual phenomenon of the image (so-called sticking), etc., the capacitance value of the storage capacitance Cs is set to reduce the DC current applied to the liquid crystal smaller than a constant level. If viewed from such viewpoint, the aforementioned value (150 fF) is enough for the value of the storage capacitance Cs. An amount of variation $\Delta$Vs in the pixel voltage Vs becomes 1.18 V by substituting above parameters into above Eq. (4).

Figure 6:
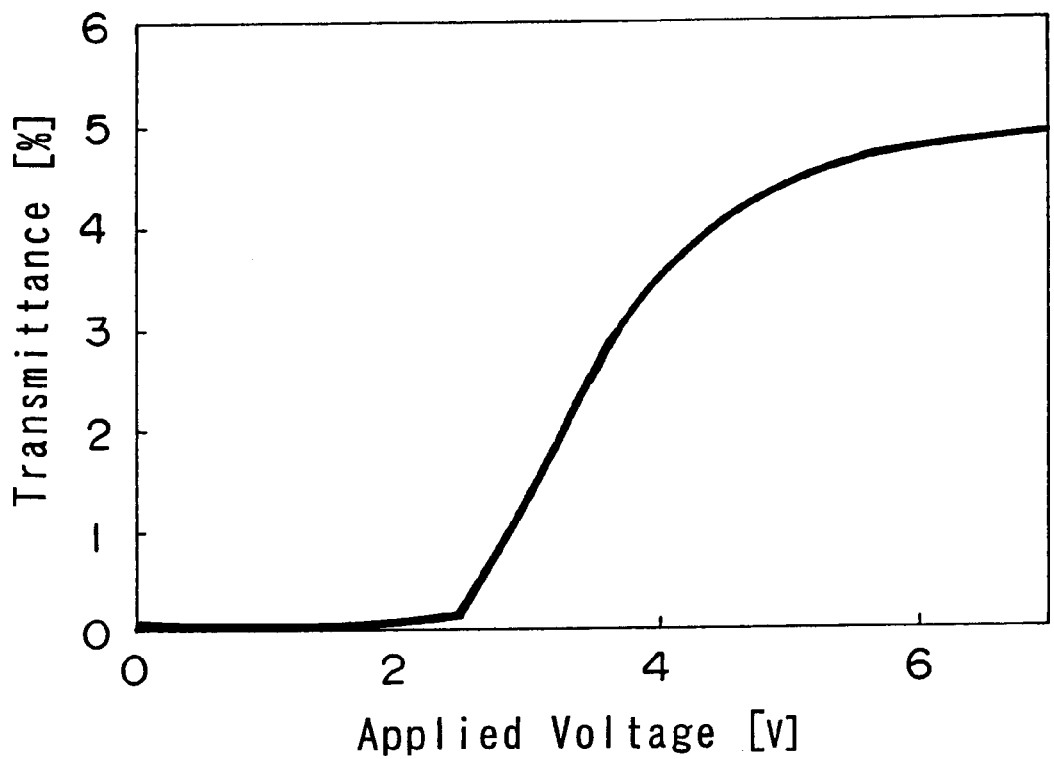
FIG. 6 is a graph showing a transmittance-voltage characteristic of the MVA system liquid crystal display device (normally black)

FIG. 6 is a graph showing a transmittance-voltage characteristic of the MVA system liquid crystal display device (normally black), wherein an abscissa denotes the applied voltage and an ordinate denotes the transmittance of the light. It is apparent from FIG. 6 that, when the voltage applied to the liquid crystal is 5.5 V, the transmittance becomes 4.60%. As described above, the pixel voltage is 4.32 V at the end of the holding period. The transmittance at this time is 3.87% from FIG. 6, which is 84% of the transmittance obtained when 5.5 V is applied. Conversely, it is possible to say that, when difference between the transmittance calculated after the variation in the pixel voltage and the transmittance based on the predetermined data voltage is in excess of 16%, the increase in the apparent response speed is caused in the actual panel.

Figure 7:
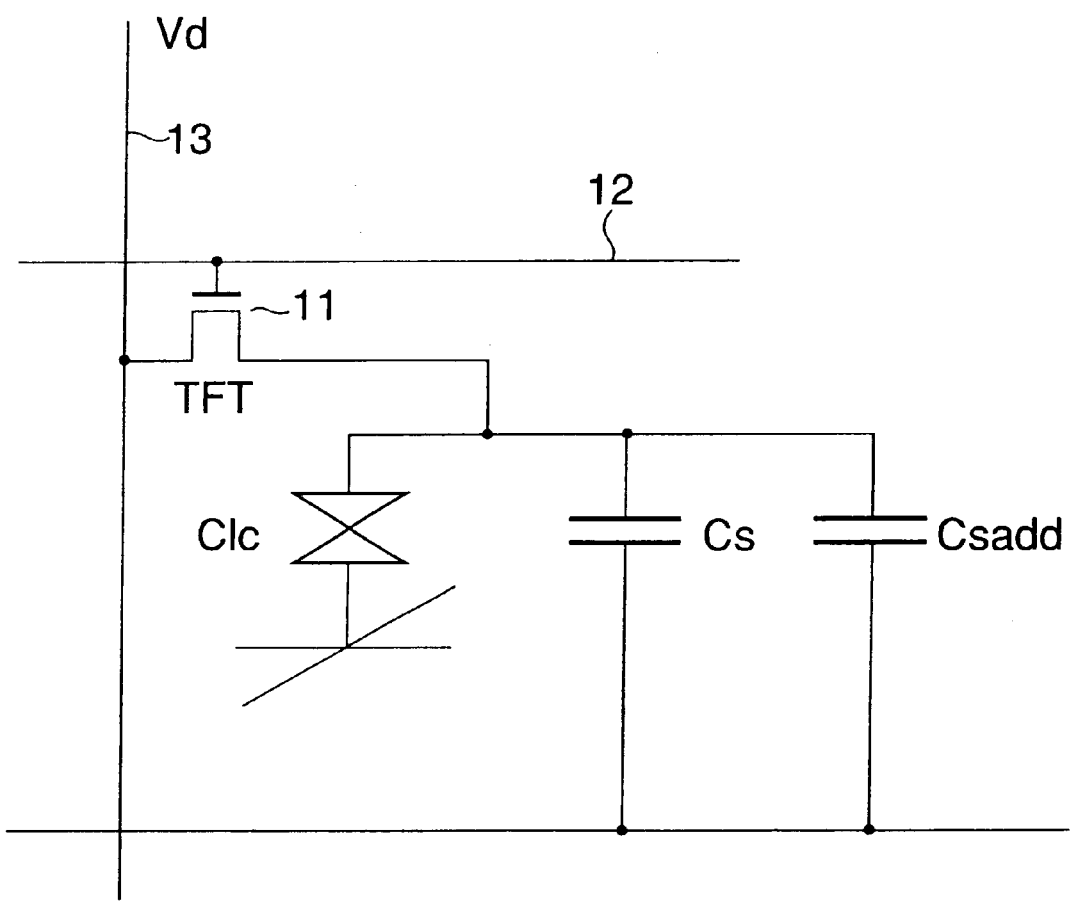
FIG. 7 is a circuit diagram showing the principle of the present invention.

FIG. 7 is a circuit diagram showing the principle of the present invention, and shows an equivalent circuit of one pixel of the liquid crystal display device. In FIG. 7, same symbols are affixed to the same parts in FIG. 2. In FIG. 7, Csadd is a capacitance added in parallel with the storage capacitance Cs (referred to as an additional capacitance hereinafter). Also, the storage capacitance Cs is the capacitance that is set for the purpose of relaxing the sticking, etc., and the capacitance value can be decided in accordance with the parasitic capacitance between the gate of the TFT and the pixel electrode and the dielectric constant of the liquid crystal, as described above. An amount of variation ΔVs' in the pixel voltage Vs due to variation in the dielectric constant of the liquid crystal when this additional capacitance Csadd is present can be given by following Eq. (5).

$$\Delta Vs' = VdW((ClcW - ClcB)/(ClcW + Cs + Csadd)) \quad (5)$$

It can be understood from Eq. (5) that, when the additional capacitance Csadd is increased, the amount of variation ΔVs' in the pixel voltage Vs can be reduced.

Figure 8:
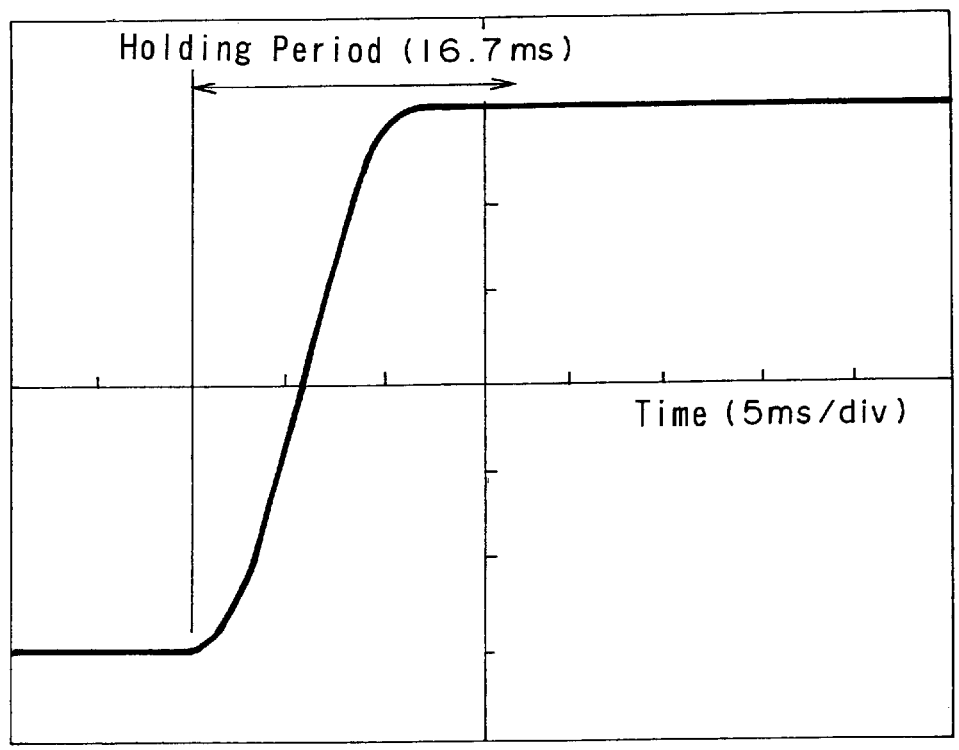
FIG. 8 is a graph showing the measured result of change in the brightness of the 15-inch MVA system liquid crystal display device to which an additional capacitance having the same capacitance value as a storage capacitance is added.

FIG. 8 is a graph showing the measured result of change in the brightness of the actual 15-inch MVA system liquid crystal display device (XGA) in which the additional capacitance Csadd is set equal to Cs (=150 fF), wherein an abscissa denotes the time and an ordinate denotes the brightness (the output of the brightness measuring apparatus). In this case, it can be seen that a gradient of the change in the brightness from the starting of loading is larger than the case in FIG. 3 and also the brightness reaches the predetermined brightness by one scanning. The large gradient of the change in the brightness meets to the situation that the amount of variation ΔVs' in the pixel voltage Vs is smaller than the amount of variation ΔVs obtained in the case where the additional capacitance Csadd is not added.

When the additional capacitance Csadd is set equal in magnitude to the storage capacitance Cs, the variation ΔVs' is about 0.87 V. Thus, it can be seen from FIG. 6 that the pixel voltage at the end of the holding period is 4.63 V and thus the transmittance at this time is 4.15%. This transmittance is equal to 90% of the transmittance 4.3% obtained when the white display data voltage 5.5 V is applied. It can be understood from this fact that, when the transmittance calculated after the variation in the pixel voltage is at least 90% of the transmittance at the predetermined display data voltage, the increase in the apparent response speed is not caused on the actual panel.

In this manner, according to the present invention, increase in the apparent optical response speed of the liquid crystal by the variation in the pixel voltage due to the variation in the dielectric constant of the liquid crystal after the loading of the display data can be suppressed by adding further the additional capacitance Csadd in parallel with the storage capacitance Cs being set based on the design standard in the prior art. As a result, the moving picture display performance of the liquid crystal display device can be improved.

Now, the explanation is made while taking as an example the case where the additional capacitance Csadd is equal in magnitude to the storage capacitance Cs. Actually, the transmittance obtained after the pixel voltage is varied by at least ΔVs' may exceed 90% or more of the transmittance obtained when the white data voltage VdW is applied. Also, as described above, the response speed is increased at the transmittance of 84% obtained when the white data voltage VdW is applied. Since it can be supposed that the increase in the response speed is just started at the time of the intermediate transmittance between them, the value of the storage capacitance Cs0 (where Cs0=Cs+Csadd) is decided in the present invention to exceed 87% of the transmittance at the time when the white data voltage VdW is applied. In other words, the storage capacitance Cs0 is set such that difference between the transmittance obtained when the pixel voltage is varied by ΔVs' and the transmittance before the variation can be reduced smaller than the transmittance before the variation by 13%.

Since the magnitude of the necessary additional capacitance Csadd is changed based on to the transmittance-voltage characteristic of the used liquid crystal and the used data voltage, it is difficult to show a particular value. However, such value may be generally expressed by Eq. (6) as follows.

$$Tr(VdW - \Delta Vs') \geq Tr(VdW) \, 0.87 \quad (6)$$

Where Tr(V) is the transmittance of the liquid crystal when the applied voltage is V. When only the transmittance-voltage characteristic of the used liquid crystal is known, it is possible to calculate the capacitance value of the necessary additional capacitance Csadd according to Eqs. (5) (6).

Another expression of the same phenomenon can be given. The transmittance-voltage characteristic shown in FIG. 6 has the different absolute value every liquid crystal but is often similar in shape. Thus, the capacitance value of such liquid crystal can be expressed by using not the final transmittance but the pixel voltage. That is, the same expression as Eq. (3) can be given by using a ratio of an amount of variation ΔVs' of the pixel voltage and the white data voltage VdW.

For example, in the above case, it is seen from FIG. 6 that the voltage which gives the transmittance of 4.0%, that is 87% of the transmittance obtained when the white data voltage is 5.5 V, is 4.4 V. Accordingly, since ΔVs'=1.1 V is 20% of VdW, the expression in following Eq. (7) can be given.

$$\Delta Vs' \leq VdW \, 0.20 \quad (7)$$

That is, the storage capacitance Cs0 is set such that the amount of variation ΔVs' of the pixel voltage can be reduced less than 20% of the pixel voltage before the variation.

The additional capacitance Csadd is expressed as the independent capacitance in the equivalent circuit to distinguish from the conventional storage capacitance Cs. However, actually the additional capacitance Csadd may be implemented by setting the capacitance value of the storage capacitance Cs0 to Cs+Csadd by increasing a size of the storage capacitance electrode constituting the storage capacitance, reducing a thickness of the dielectric layer constituting the storage capacitance, or changing the structure of the storage capacitance. Where Cs is a design value of the storage capacitance Cs based on the design standard in the prior art.

Also, the additional capacitance Csadd is inserted between the pixel electrode and the storage capacitance bus line in the equivalent circuit. However, since the similar operation can be attained when the additional capacitance Csadd is inserted between the pixel electrode and the fixed potential, the additional capacitance Csadd may be added by overlapping spatially the pixel electrode on the gate bus line or the data bus line of the adjacent pixel, for example.

In the above description, explanation is made by using the measured results of the MVA system liquid crystal display device. But the present invention may also be applied to the TN (Twisted Nematic) or IPS (In-Plane Switching) system liquid crystal display device. In the above description, the normally black type liquid crystal display device is explained, but the present invention may also be applied to the normally white type liquid crystal display device. In this case, in the case of the normally white system, the relationship between the white display and the black display is inversely changed.

Embodiments of the present invention will be explained with reference to the accompanying drawings hereinafter.

(First Embodiment)

Figure 9:
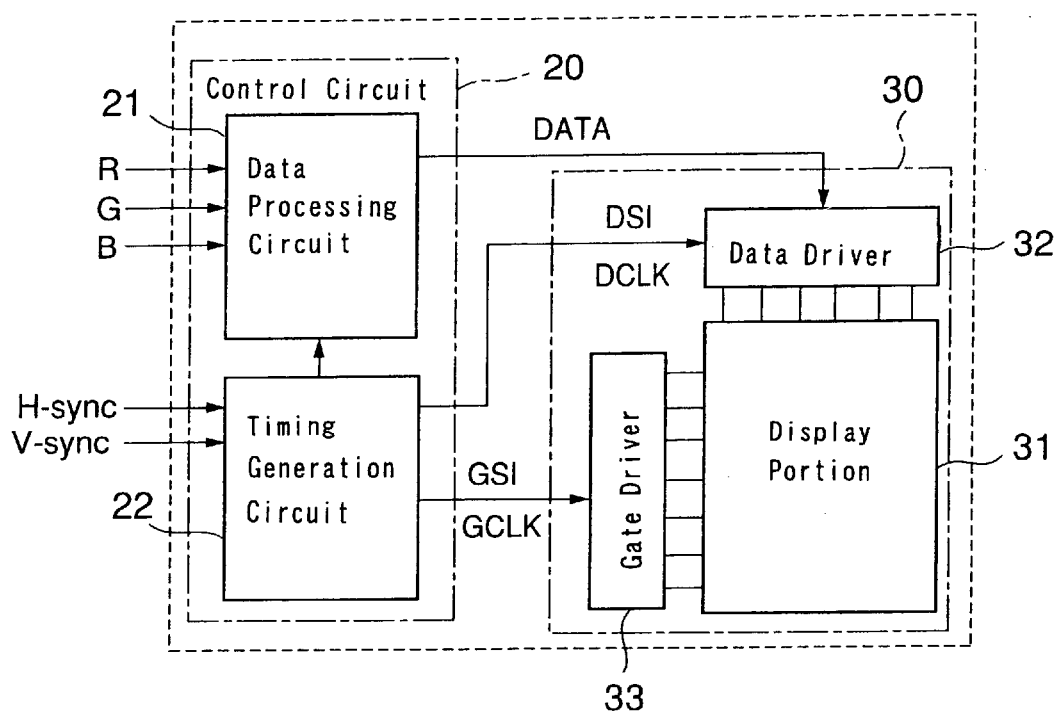
FIG. 9 is a block diagram showing a configuration of a liquid crystal display device according to a first embodiment of the present invention.
Figure 10:
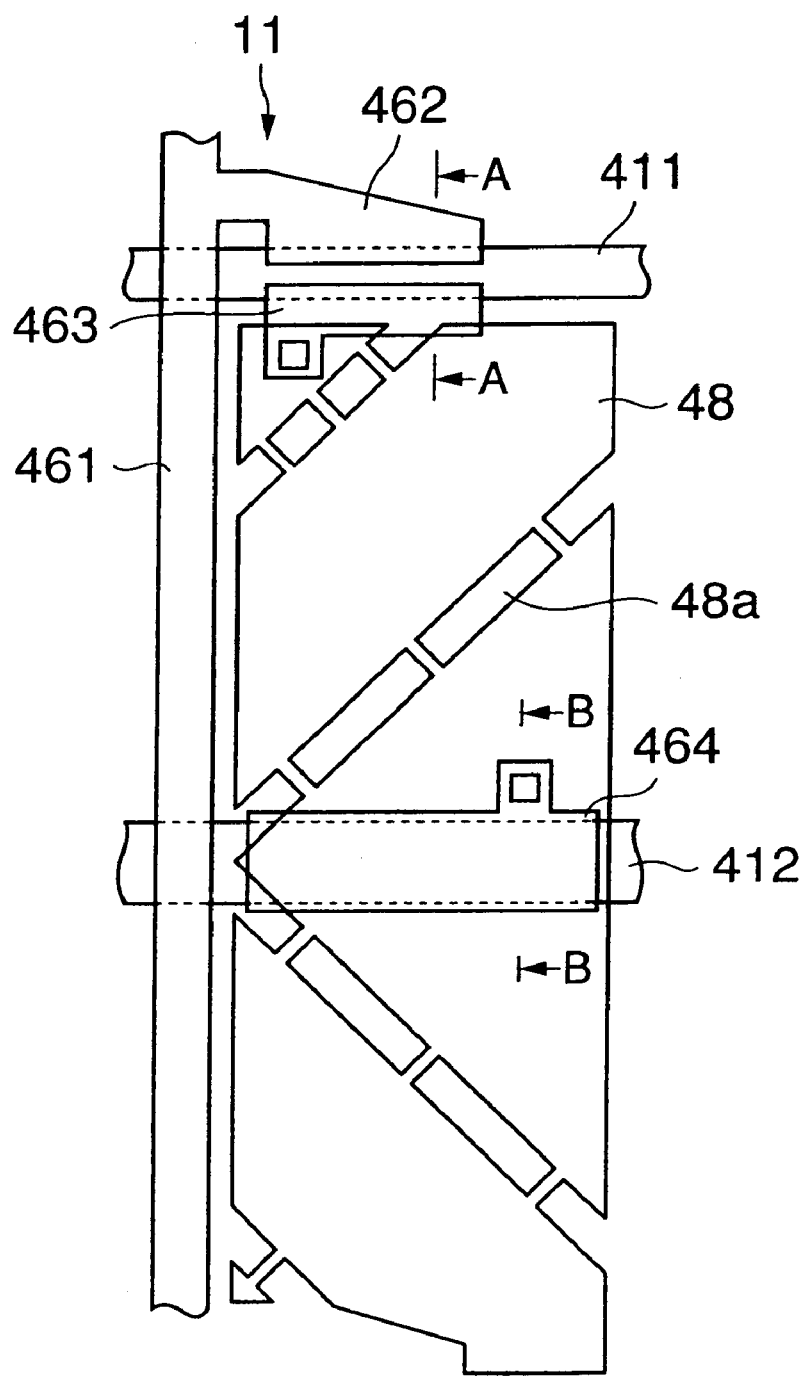
FIG. 10 is a plan view showing one pixel in a liquid crystal panel of the liquid crystal display device according to the first embodiment.

FIG. 9 is a block diagram showing a configuration of a liquid crystal display device according to a first embodiment of the present invention. FIG. 10 is a plan view showing one pixel in a liquid crystal panel of the liquid crystal display device shown in FIG. 9. The present embodiment is an example in which the present invention is applied to the MVA system liquid crystal display device.

A control circuit 20 consists of a data processing circuit 21 and a timing generating circuit 22. The data processing circuit 21 receives display data RGB from the personal computer, etc., and then outputs a display data signal DATA at a predetermined timing. The timing generating circuit 22 receives a horizontal synchronizing signal H-sync and a vertical synchronizing signal V-sync, and then generates signals such as a gate start signal GSI indicating start of one vertical synchronizing period, a gate clock GCLK which is synchronism with the horizontal synchronizing signal H-sync, a data start signal DSI indicating start of one horizontal synchronizing period, and a data clock DCLK indicating a transfer timing of the display data signal DATA, etc. to output them.

A liquid crystal panel 30 consists of a display portion 31, a data driver 32, and a gate driver 33. In this example, 3072 (1024×3 (RGB)) pixels and 768 pixels are aligned in the horizontal direction and the vertical direction on the display portion 31 respectively. As shown in FIG. 7, the TFT 11, the storage capacitance Cs, and the additional capacitance Csadd are provided to each pixel respectively.

Also, 3072 data bus lines 462 extending along the vertical direction and 768 gate bus lines 411 extending along the horizontal direction are formed on the display portion 31. As shown in FIG. 10, a source electrode 463 of the TFT 11 is connected to a pixel electrode 48, and a drain electrode 462 is connected to a data bus line 461. A portion of the gate bus lines 411 positioned between the source electrode 463 and the drain electrode 462 serves as the gate electrode of the TFT 11. In addition, storage capacitance bus lines 412 are formed in parallel with the gate bus lines 411, and a storage capacitance electrode 464 is formed over the storage capacitance bus line 412 in every pixel. In this case, the storage capacitance bus line 412 is kept as a constant potential.

A plurality of slits 48a arranged in the oblique direction are provided in the pixel electrode 48. The alignment division (multi-domain) can be achieved by these slits 48a and projections (not shown) provided on the opposing substrate side. Details of the alignment division are set forth in Japanese Patent 2947350 Gazette.

The data driver 32 supplies the display data DATA to the data bus lines 461 at predetermined timings. Also, the gate driver 33 supplies the scanning pulses in sequence to respective gate bus lines 411 every period of one vertical synchronizing period.

Figure 11A:
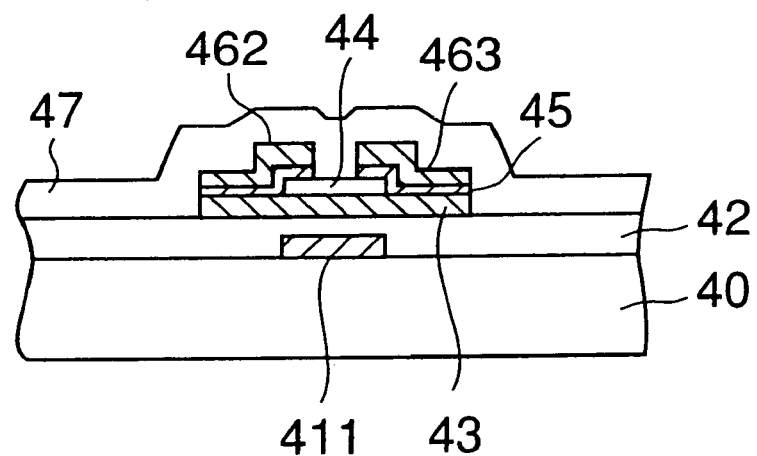
FIG. 11A is a sectional view showing a sectional shape taken along an A—A line in FIG. 10.
Figure 11B:
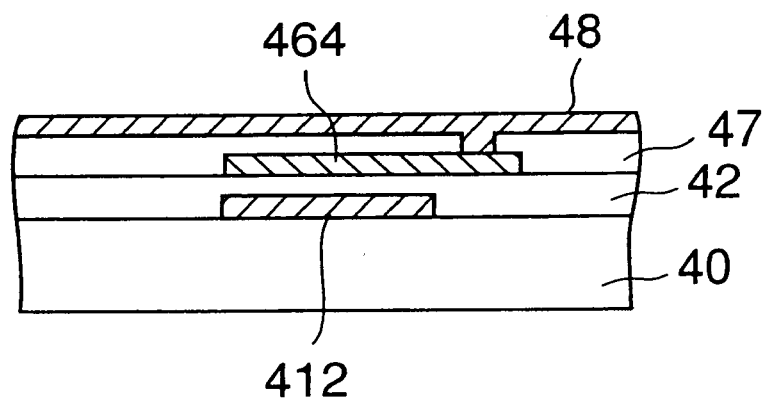
FIG. 11B is a sectional view showing a sectional shape taken along a B—B line in FIG. 10.

FIG. 11A is a sectional view showing a sectional shape taken along an A—A line in FIG. 10, and FIG. 11B is a sectional view showing a sectional shape taken along a B—B line in FIG. 10. In this example, a liquid crystal display device having inverse stagger TFTs formed by five-mask steps is shown as an example of the 15-inch MVA system liquid crystal display device (XGA).

A gate bus line 411 and a storage capacitance bus line 412 are formed as first wiring layers on a glass substrate 40. An insulating film (gate insulating film) 42 made of SiN is formed on these first wiring layers. In a TFT forming portion (FIG. 11A), a silicon (amorphous silicon) film 43 serving as an active layer of the TFT 11 is formed on the insulating film 42, and then an etching stopper film 44 made of SiN, a silicon (amorphous silicon) film 45 into which an n-type impurity is introduced with high concentration, and a source electrode 463 and a drain electrode 462 made of a metal film are formed on the silicon film 43. Also, a data bus line 461 is also formed on the insulating film 42. The data bus line 461 and the drain electrode 462 are electrically connected to each other.

In a storage capacitance forming portion (FIG. 11B), a storage capacitance electrode 464 made of metal is formed on the insulating film 42 over the storage capacitance bus line 412. All the storage capacitance electrode 464, the source electrode 463, the drain electrode 462, and the data bus line 461 belongs second wiring layers, and these are formed simultaneously by etching the same metal film. An insulating film (final protection film) 47 made of SiN is formed to cover the second wiring layers. Then, a pixel electrode 48 made of ITO is formed on the insulating film 47. The pixel electrode 48 is electrically connected to the storage capacitance electrode 464 via a contact hole provided in the insulating film 47.

Also, an alignment film (not shown) made of polyimide, etc. is formed over the insulating film 47 to contain the pixel electrode 48.

In the present embodiment, a width of the storage capacitance bus line 412 is about 20 μm, a width of the storage capacitance electrode 464 is about 24 μm, a thickness of the insulating film 42 is about 3500 Å, and a thickness of the insulating film 47 is about 3300 Å. The storage capacitance Cs0 is formed of the storage capacitance bus line 412, the pixel electrode 48, the storage capacitance electrode 464, and the insulating film 47 between them, and has the capacitance value of about 300 fF.

Figure 1:
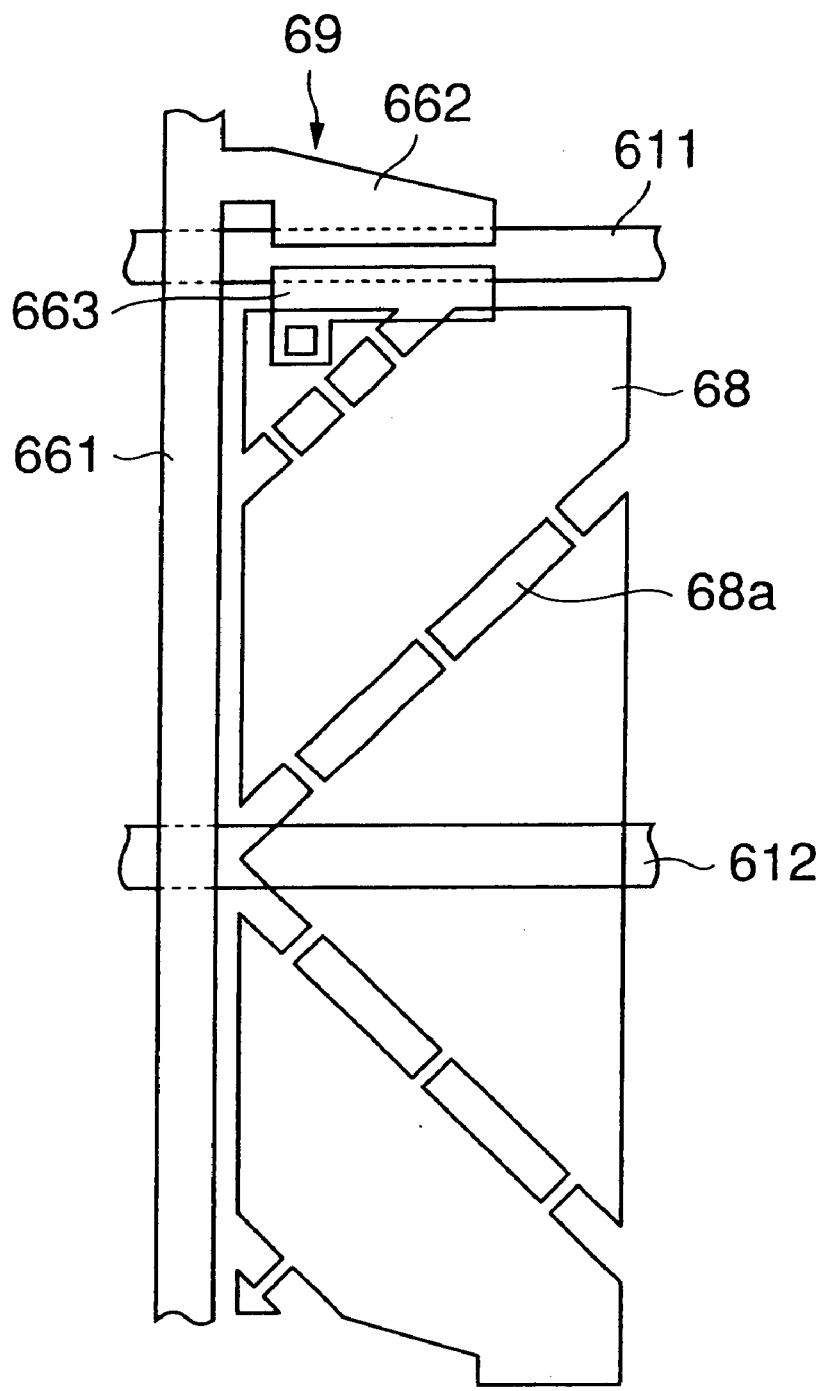
FIG. 1 is a plan view showing one pixel of a liquid crystal display device in the prior art.

In contrast, in the prior art, as shown in FIG. 1, the storage capacitance Cs is formed of the storage capacitance bus line 612, the pixel electrode 68, and the insulating film between them. When a double-layered insulating film (corresponding to the insulating films 42, 47 in the present embodiment) is present between the storage capacitance bus line 612 and the pixel electrode 68, the capacitance value of the storage capacitance Cs is about 150 fF since the thickness of the insulating film (dielectric film) between the electrodes constituting the storage capacitance becomes about two times. In other words, in the present embodiment, the additional capacitance Csadd having the same value as the storage capacitance Cs is added to the storage capacitance Cs that is designed according to the design standard in the prior art.

Figure 12:
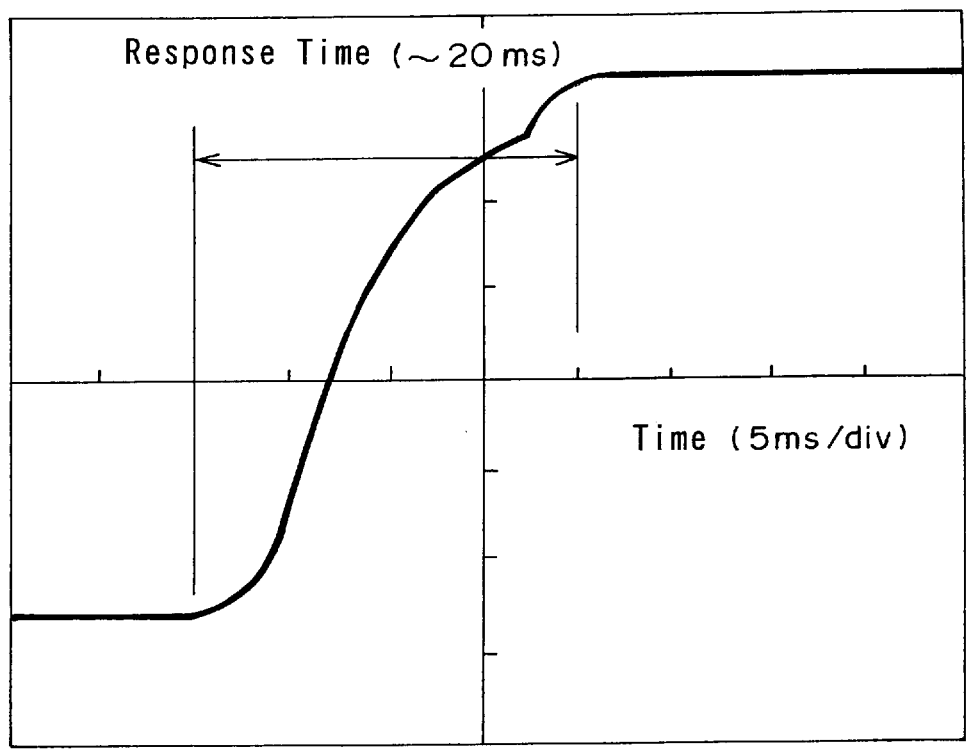
FIG. 12 is a graph showing the measured result of a response time of the liquid crystal display device in the prior art.
Figure 13:
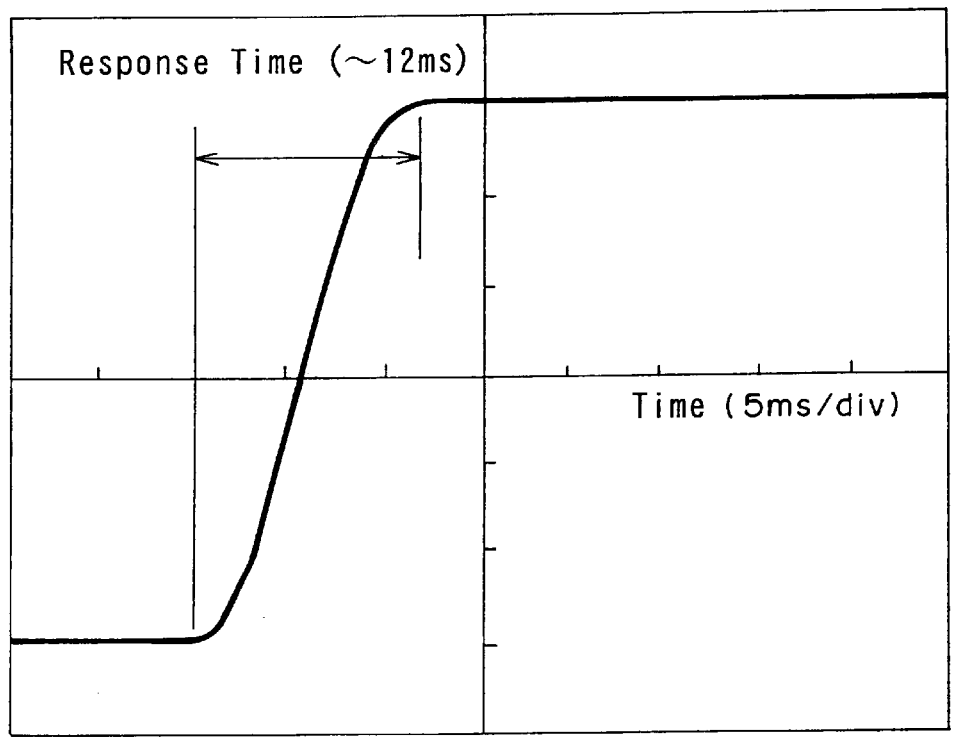
FIG. 13 is a graph showing the measured result of the response time of the liquid crystal display device according to the first embodiment.

FIG. 12 is a graph showing the measured result of a response time of the liquid crystal display device in the prior art. FIG. 13 is a graph showing the measured result of the response time of the liquid crystal display device according to the first embodiment. As shown in FIG. 13, in the present embodiment, the response can be completed such that the transmittance has the same value as that obtained when the white data voltage is applied by one scanning. When the storage capacitance Cs is 150 fF, the apparent brightness response time is 20 msec in the prior art, as shown in FIG. 12, while the apparent brightness response time is shortened up to about 12 msec in the present embodiment, as shown in FIG. 13.

An amount of the variation ΔVs in the pixel voltage due to the variation in the dielectric constant of the liquid crystal after the loading can be calculated by following Eq. (8).

$$\Delta Vs = VdW((ClcW - ClcB)/(ClcW + Cs0)) \quad (8)$$

In this case, since VdW=5.5 V, ClcW=270 fF, ClcB=180 fF, and Cs0=300 fF, the variation ΔVs=0.87 V. Accordingly, when the holding period is terminated, the pixel voltage Vs is 4.63 V and the transmittance is 4.15%. This transmittance is 90% of the transmittance of 4.6% obtained when the white data voltage of 5.5 V is applied.

Also, this variation ΔVs=0.87 V is 15.8% of the white data voltage of 5.5 V and is smaller than 20%.

In this manner, in the present embodiment, the pixel voltage can be increased up to the predetermined voltage in response to the display data signal within one scanning period. Therefore, the moving picture display performance of the liquid crystal display device can be improved, and thus the liquid crystal display device of the present embodiment can be adapted for the display of the multimedia oriented personal computer and the TV receiver set.

(Second Embodiment)

Figure 14:
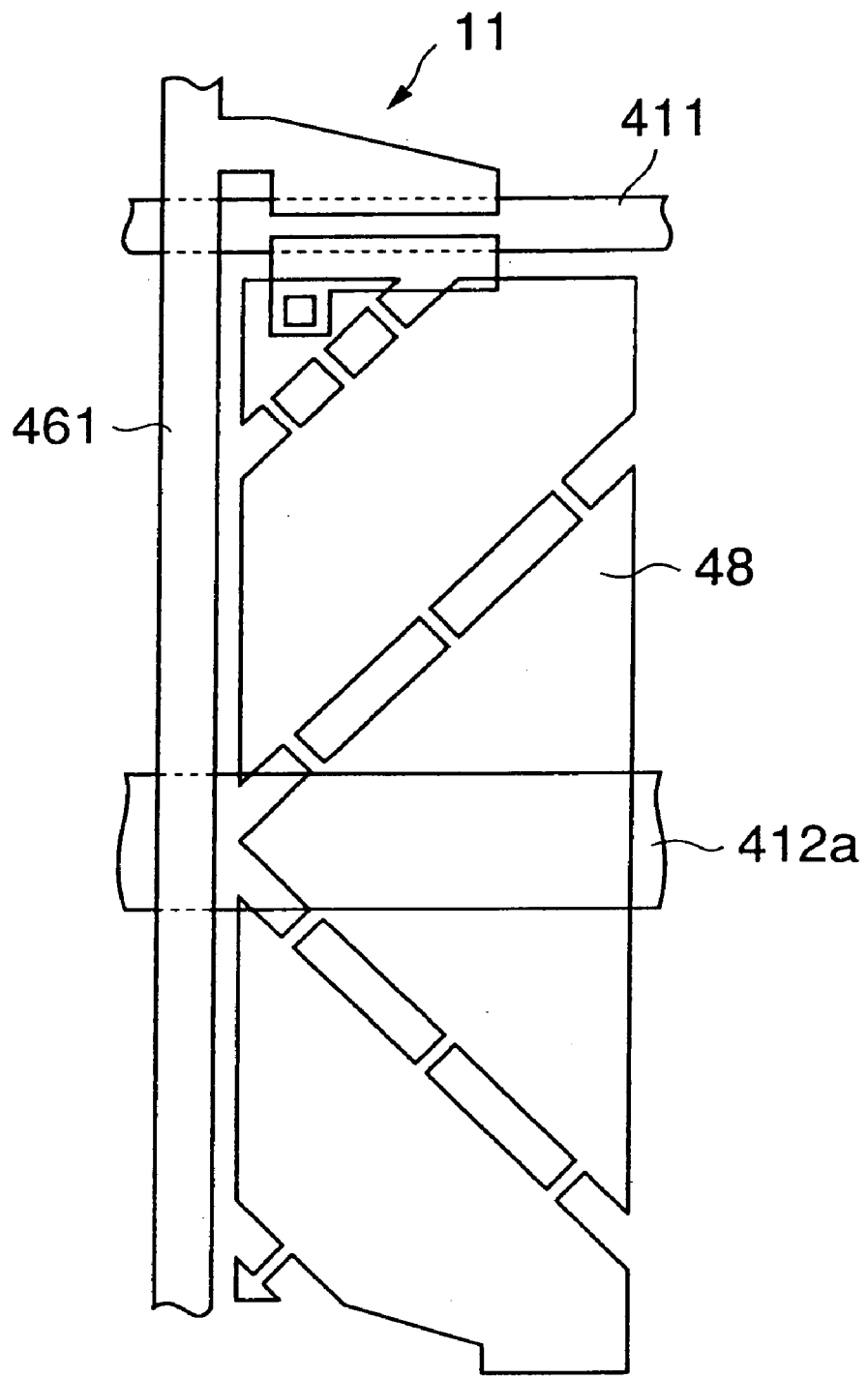
FIG. 14 is a plan view showing one pixel in a liquid crystal panel of a liquid crystal display device according to a second embodiment of the present invention.

FIG. 14 is a plan view showing one pixel in a liquid crystal panel of a liquid crystal display device according to a second embodiment of the present invention. A difference of the present embodiment from the first embodiment is that the structure of the storage capacitance is different. Since other structures are basically similar to the first embodiment, their explanation of redundant portions will be omitted.

In the present embodiment, a width of a storage capacitance bus line 412a is decided as follows.

It is assumed that the storage capacitor Cs designed based on the design standard in the prior art is 180 fF and a capacitance of 30 fF is added to the storage capacitance Cs as the additional capacitance Csadd. In this case, when an amount of the variation ΔVs in the pixel voltage Vs is calculated by Eq. (4), ΔVs=1.1 V. Accordingly, it can be seen from FIG. 6 that, since the pixel voltage is 4.4 V when the holding period is terminated, the transmittance becomes 4.0%. This value is equivalent to 87% of the transmittance 4.6% when the white data voltage of 5.5 V is applied. Also, the amount of the variation ΔVs in the pixel voltage Vs is equivalent to 20% of the white data voltage of 5.5 V. The additional capacitance Csadd can be implemented by increasing the width of the storage capacitance bus line larger than the width decided based on the design standard in the prior art by about 20%. That is, in the present embodiment, the width of the storage capacitance bus line 412a is set 1.2 times of the width of the storage capacitance bus line based on the design standard in the prior art.

In the present embodiment, since the width of the storage capacitance bus line 412a is decided as described above, an amount of variation in the pixel voltage that is loaded on the pixel in one scanning period can be reduced in the holding period. Accordingly, the variation in the transmittance in the holding period can be reduced, and also the display quality of the moving picture can be improved.

(Other Embodiments)

FIG. 15 to FIG. 19 are views showing other embodiments of the present invention. Differences of these embodiments from the first embodiment are that structures of the storage capacitances are different. In FIG. 15 to FIG. 19, same references are affixed to the same parts in FIG. 10 and their detailed explanation will be omitted.

Figure 15:
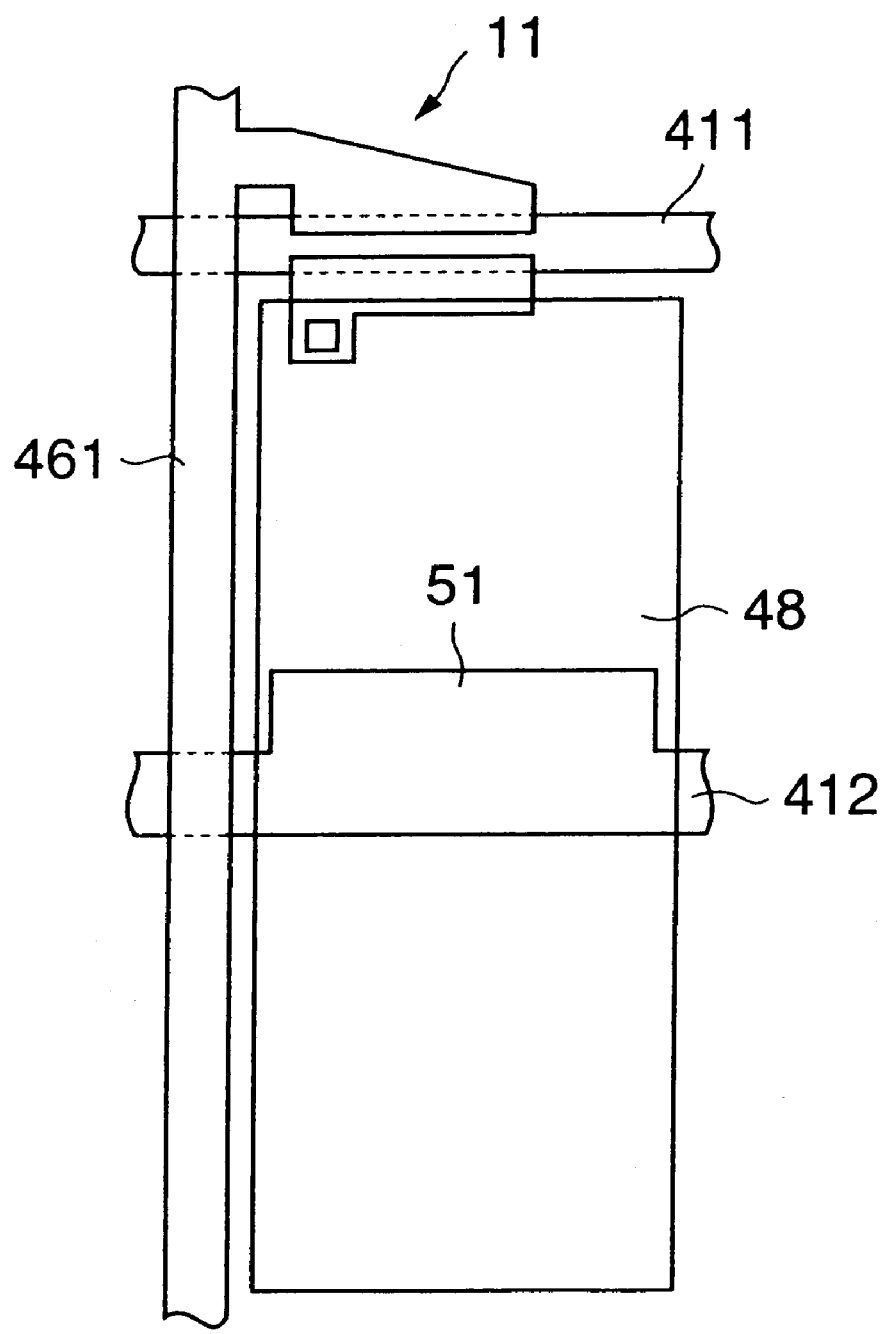
FIG. 15 is a plan view showing one pixel in a liquid crystal panel of a liquid crystal display device #1 according to other embodiments of the present invention.

In a liquid crystal display device shown in FIG. 15, an additional capacitance electrode 51 is formed and connected to the storage capacitance bus line 412 whose width is set based on the design standard in the prior art. The capacitance value of the additional capacitance consisting of this additional capacitance electrode 51 and the pixel electrode 48 is set such that, as described above, a difference between the transmittance obtained when the pixel voltage is varied by ΔVs and the transmittance before the variation can be reduced smaller by 13% than the transmittance before the variation.

Figure 16A:
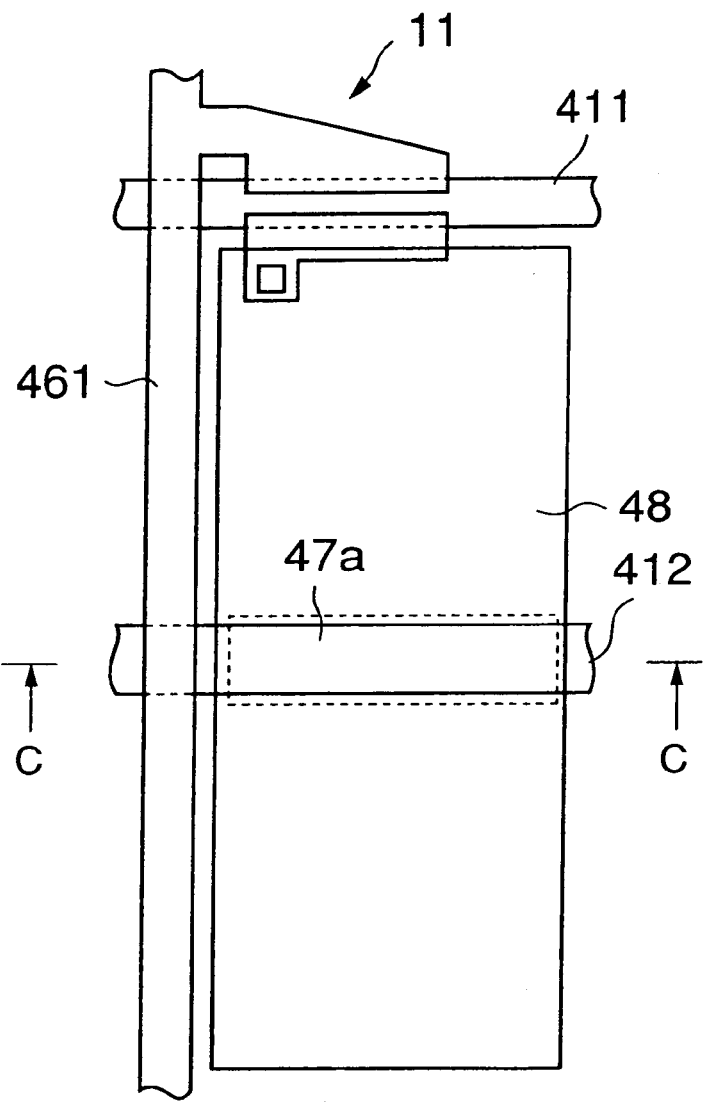
FIG. 16A is a plan view showing one pixel in a liquid crystal panel of a liquid crystal display device #2 according to other embodiments of the present invention.
Figure 16B:
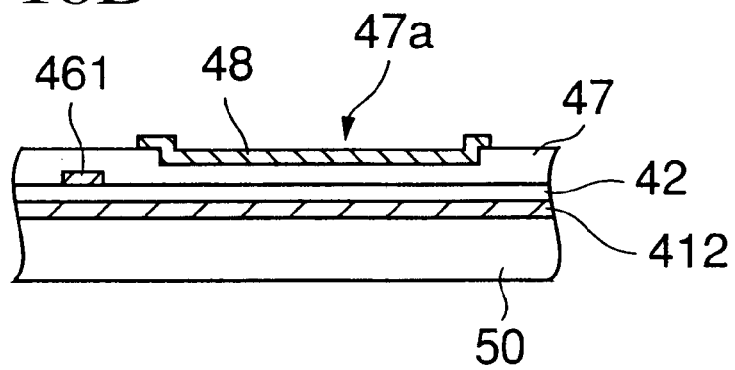
FIG. 16B is a sectional view showing a sectional shape taken along a C—C line in FIG. 16A.

In a liquid crystal display device whose plan view is shown in FIG. 16A and whose sectional view taken along a C—C line in FIG. 16A is shown in FIG. 16B, a concave portion 47a is provided in the insulating film 47 on the storage capacitance bus line 412. Accordingly, a distance between the storage capacitance bus line 412 constituting the storage capacitance and the pixel electrode 48 can be reduced and thus the storage capacitance is increased rather than the prior art. A depth of the concave portion 47a in the insulating film 47 is set such that a difference between the transmittance obtained when the pixel voltage is varied by ΔVs and the transmittance before the variation can be reduced smaller by 13% than the transmittance before the variation.

Figure 17A:
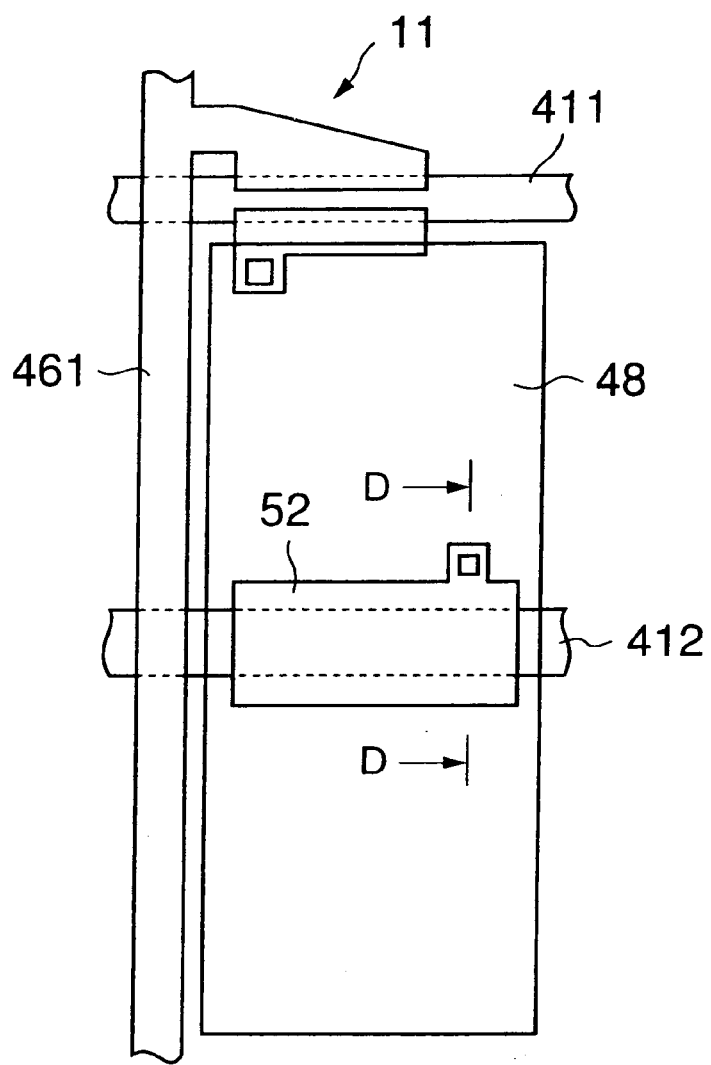
FIG. 17A is a plan view showing one pixel in a liquid crystal panel of a liquid crystal display device #3 according to other embodiments of the present invention.
Figure 17B:
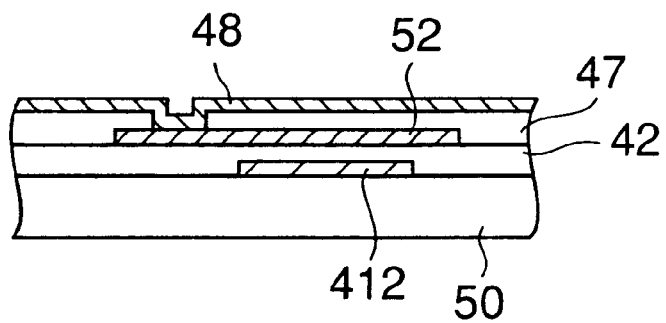
FIG. 17B is a sectional view showing a sectional shape taken along a D—D line in FIG. 17A.

In a liquid crystal display device whose plan view is shown in FIG. 17A and whose sectional view taken along a D—D line in FIG. 17A is shown in FIG. 17B, a storage capacitance electrode 52 is formed over the storage capacitance bus line 412. This storage capacitance electrode 52 is electrically connected to the pixel electrode 48 via a contact hole formed in the insulating film 47. In this example, the capacitance value of the storage capacitance is also set such that, as described above, the difference between the transmittance obtained when the pixel voltage is varied by ΔVs and the transmittance before the variation can be reduced smaller by 13% than the transmittance before the variation.

Figure 18:
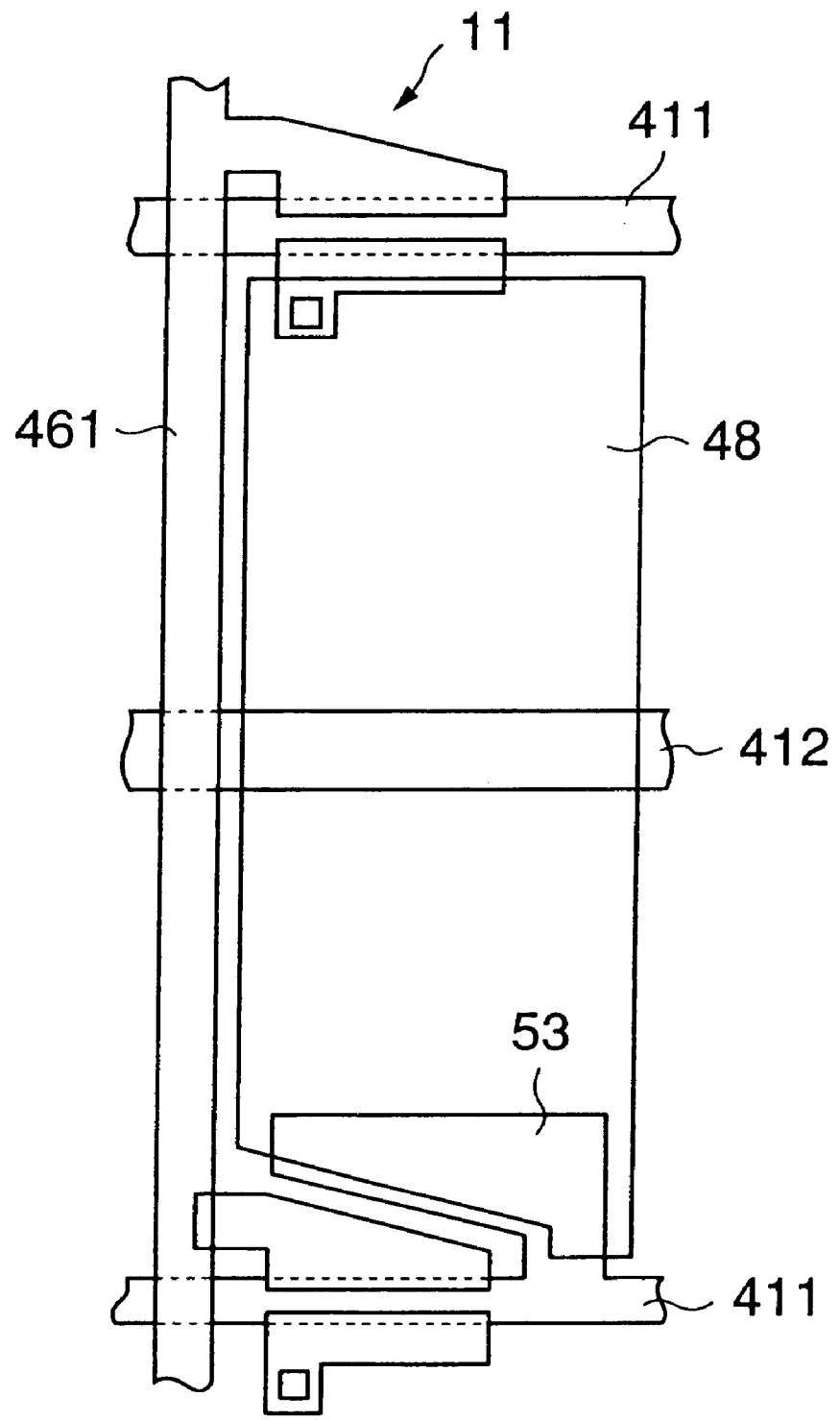
FIG. 18 is a plan view showing one pixel in a liquid crystal panel of a liquid crystal display device #4 according to other embodiments of the present invention.

In a liquid crystal display device shown in FIG. 18, an additional capacitance electrode 53 is formed under the pixel electrode 48, and this additional capacitance electrode 53 is connected to the gate bus line 411 of the adjacent pixel in the vertical direction. Then, the capacitance value of the additional capacitance consisting of the additional capacitance electrode 53 and the pixel electrode 48 is set such that, as described above, the difference between the transmittance obtained when the pixel voltage is varied by ΔVs and the transmittance before the variation can be reduced smaller by 13% than the transmittance before the variation.

Figure 19:
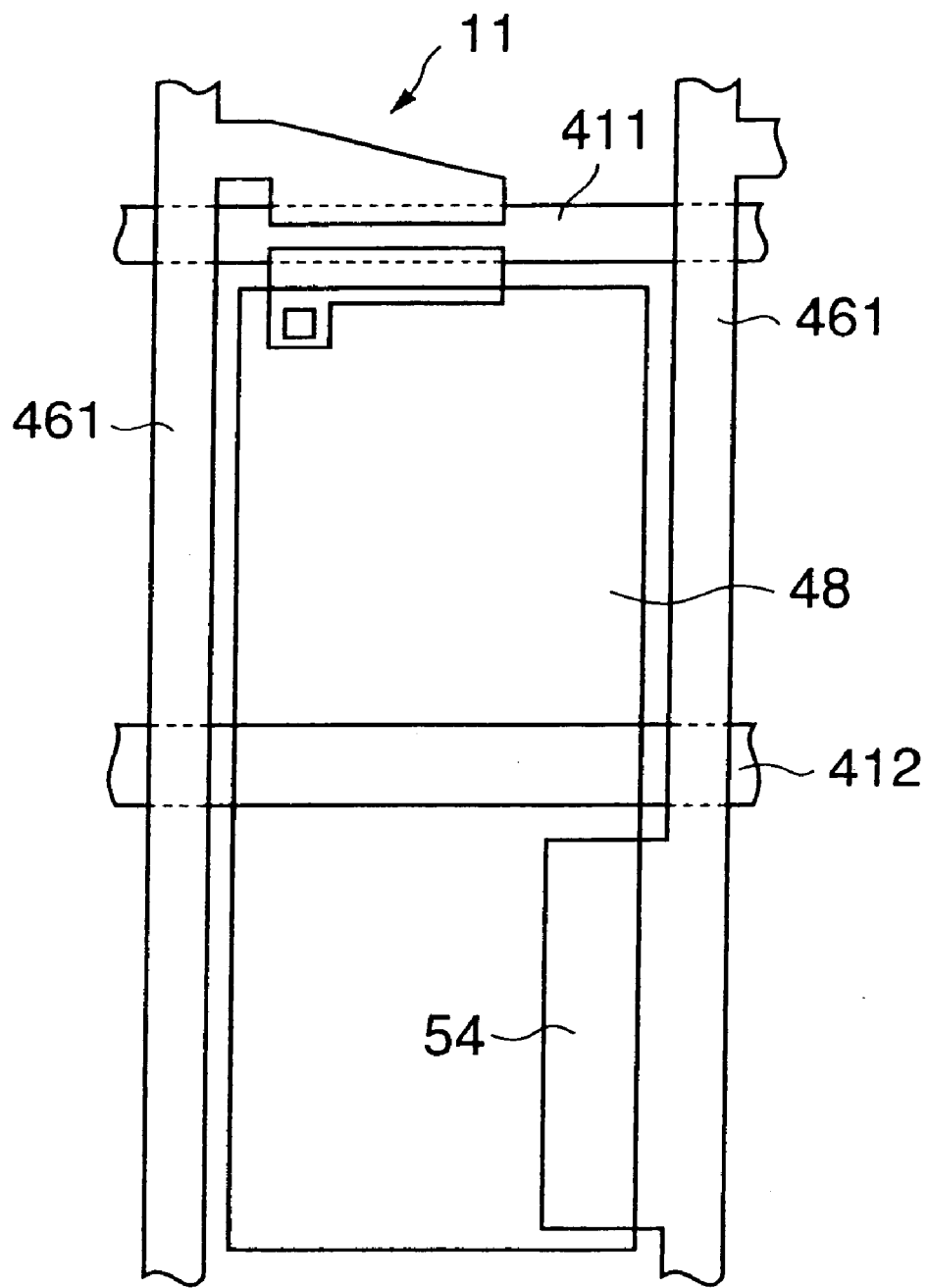
FIG. 19 is a plan view showing one pixel in a liquid crystal panel of a liquid crystal display device #5 according to other embodiments of the present invention.

In a liquid crystal display device shown in FIG. 19, an additional capacitance electrode 54 is formed under the pixel electrode 48, and this additional capacitance electrode 54 is connected to the data bus line 461 of the adjacent pixel in the horizontal direction. Then, the capacitance value of the additional capacitance consisting of the additional capacitance electrode 54 and the pixel electrode 48 is set such that, as described above, the difference between the transmittance obtained when the pixel voltage is varied by ΔVs and the transmittance before the variation can be reduced smaller by 13% than the transmittance before the variation.

In these embodiments, the same advantages as the first and second embodiments can be achieved.

What is claimed is:

1. A liquid crystal display device, comprising:

a pixel capacitance formed by a pixel electrode; and a storage capacitance added to the pixel capacitance, wherein the liquid crystal display suppresses variation of a transmittance generated by variation of element voltage due to a change of a dielectric constant of a liquid crystal, the change of dielectric constant of the liquid crystal being longer than a scanning period, when a pixel is changed from white to black or from black to white, a capacitance value of the storage capacitance is set such that a transmittance T1 obtained at a voltage V1 of the pixel electrode when a scanning period is terminated is substantially equal to a transmittance T2 obtained at a voltage V2 of the pixel electrode when a holding period is terminated.

2. A normally black type liquid crystal display device, comprising:

a pixel capacitance formed by a pixel electrode; and a storage capacitance added to the pixel capacitance, a capacitance value $Cs0$ of the storage capacitance is set such that difference between a transmittance obtained at a pixel voltage, that is changed by an amount of variation $\Delta Vs$ expressed by following equation, $$\Delta Vs = VdW((ClcW - ClcB)/(ClcW + Cs0))$$

and a transmittance obtained at a white data voltage VdW can be reduced smaller than 13% of the transmittance obtained at the white data voltage VdW, when it is assumed that the white data voltage is VdW, a liquid crystal capacitance in white display is ClcW, and a liquid crystal capacitance in black display is ClcB.

3. A normally black type liquid crystal display device, comprising:

a pixel capacitance formed by a pixel electrode; and a storage capacitance added to the pixel capacitance, a capacitance value $Cs0$ of the storage capacitance is set such that an amount of variation $\Delta Vs$ of a pixel voltage expressed by following equation $$\Delta Vs = VdW((ClcW - ClcB)/(ClcW + Cs0))$$

can be reduced smaller than 20% of an absolute value of a white data voltage VdW, when it is assumed that the white data voltage is VdW, a liquid crystal capacitance in white display is ClcW, and a liquid crystal capacitance in black display is ClcB.

4. A normally white type liquid crystal display device, comprising:

a pixel capacitance formed by a pixel electrode; and a storage capacitance added to the pixel capacitance, a capacitance value $Cs0$ of the storage capacitance is set such that difference between a transmittance obtained at a pixel voltage, that is changed by an amount of variation $\Delta Vs$ expressed by following equation, $$\Delta Vs = VdB((ClcB - ClcW)/(ClcB + Cs0))$$

and a transmittance obtained at the black data voltage VdB can be reduced smaller than 13% of the transmittance obtained at a black data voltage VdB, when it is assumed that the black data voltage is VdB, a liquid crystal capacitance in black display is ClcB, and a liquid crystal capacitance in white display is ClcW.

5. A normally white type liquid crystal display device, comprising:

a pixel capacitance formed by a pixel electrode;

and a storage capacitance added to the pixel capacitance, a capacitance value $Cs0$ of the storage capacitance is set such that an amount of variation $\Delta Vs$ of a pixel voltage expressed by following equation $$\Delta Vs = VdB((ClcB - ClcW)/(ClcB + Cs0))$$

can be reduced smaller than 20% of an absolute value of a black data voltage VdB, when it is assumed that the black data voltage is VdB, a liquid crystal capacitance in black display is ClcB, and a liquid crystal capacitance in white display is ClcW.

* * * * *